United States Patent [19]

Gellert

[11] 4,450,999

[45] May 29, 1984

[54] INJECTION MOLDING HOT TIP SEAL

[76] Inventor: Jobst U. Gellert, 7A Prince St., Glen Williams, Ontario, Canada

[21] Appl. No.: 399,787

[22] Filed: Jul. 19, 1982

[30] Foreign Application Priority Data

Jul. 12, 1982 [CA] Canada ................... 407096

[51] Int. Cl.³ .............................................. B29F 1/04
[52] U.S. Cl. ................................... 228/176; 425/549; 228/182
[58] Field of Search ....................... 228/176, 170, 182; 425/549, 566, 567, 317

[56] References Cited

U.S. PATENT DOCUMENTS

| | | | |
|---|---|---|---|
| 3,281,898 | 11/1966 | Compton | 425/568 |
| 3,492,716 | 2/1970 | McNeal, Jr. | 228/182 X |
| 4,043,740 | 8/1977 | Gellert | 425/566 X |
| 4,125,352 | 11/1978 | Gellert | 425/566 |
| 4,276,015 | 6/1981 | Rogers | 425/566 |
| 4,279,588 | 7/1981 | Gellert | 425/568 |

*Primary Examiner*—Kenneth J. Ramsey
*Attorney, Agent, or Firm*—Riches, McKenzie & Herbert

[57] ABSTRACT

An improved hot tip nozzle seal for use in a sprue gated injection molding system and a method of manufacture. The nozzle seal has a cylindrical outer portion, an elongated central pin portion and a number of ribs extending therebetween to define a number of apertures through the nozzle seal. The outer portion is seated in both the heated nozzle and the cavity plate to bridge the insulative air gap between them. The central pin portion of the seal has a tip portion which extends downstream into the gate and a head portion which extends upstream into the nozzle bore. The central pin portion has an inner conductive portion formed of copper and an outer protective casing formed of steel. The seal is designed so that the head portion picks up a predetermined amount of heat from the surrounding melt and transfers it through the highly conductive copper to the tip portion which extends to where it is required, without being unacceptably susceptible to abrasion or corrosion from difficult materials such as glass filled flame retardant nylon. The seal is made by integrally filling the steel pin casing with copper in a vacuum furnace. The filled casing is then brazed into a body portion with the ribs and a cap brazed on in the vacuum furnace to provide the integral abrasion and corrosion resistant nozzle seal.

1 Claim, 8 Drawing Figures

INJECTION MOLDING HOT TIP SEAL

BACKGROUND OF THE INVENTION

This invention relates to injection molding and more particularly to an improved nozzle seal with a hot tip for use in a sprue gated system and to a method of making the same.

The heated nozzle in such a system is separated from the cooled cavity plate in which it sits by an insulative air space and it is known to bridge this air space or gap by a hollow cylindrical nozzle seal. The seal is seated in the heated nozzle and extends to contact the cavity plate around the gate so that the melt passage through the heated nozzle is continued through the nozzle seal and the gate into the cavity. The use of such a nozzle seal in a valve gated system is shown in the applicant's U.S. Pat. No. 4,043,740 which issued Aug. 23, 1970 entitled "Injection Molding Nozzle Seal". This structure was successful in sealing off the air space and providing for the conduction by the seal of a limited amount of heat to the area of the gate.

As is well known, the provision of heat to the melt in the area of the gate is critical to the satisfactory operation of the system. The cooling effect of the adjacent cavity plate must be offset, but only to the extend necessary to result in reliable functioning of the system. This is becoming increasing more important as the use of injection molding is being constantly expanded to include more and more difficult materials with larger numbers of cavities where reliable long term operation is even more important. A recent provision in this regard for valve gated systems is shown in the applicant's U.S. Pat. No. 4,406,609, entitled "Valve Pin and Method of Manufacture" which discloses a valve pin partially filled with a highly conductive material.

The problem is even more serious in some respects in regard to sprue gated systems which do not have a valve pin which controls flow and displaces some of the melt in the gate area in the closed position. The applicant's U.S. Pat. No. 4,279,588 which issued July 21, 1981 entitled "Hot Tip Seal" shows a seal with a central pin portion for conducting additional heat into the area of the gate itself. As described in U.S. Pat. No. 4,279,588, the central pin portion may be formed of a beryllium copper alloy to improve the conduction of heat. However, while this has been quite successful for some materials, for other materials the beryllium copper or other conductive material has been found to be unacceptably susceptible to abrasion and corrosion from the melt. For instance, glass filled engineering materials may be quite abrasive and corrosive and yet have sharp melting points which requires additional heat in the gate area.

Another provision for sprue gated systems is shown in the applicant's Canadian Pat. No. 1,153,523 which issued Sept. 13, 1983 entitled "Injection Molding Fixed Pin Gate". However, this is more costly and has the same problem of being susceptible to abrasion and corrosion.

SUMMARY OF THE INVENTION

Accordingly, it is an object of the invention to at least partially overcome these problems by providing a hot tip nozzle seal with an improved combination of the characteristics of abrasion and corrosion resistance and thermal conductivity.

To this end, in one of its aspects, the invention provides a sprue gated injection molding system having a heated nozzle seated in a cavity plate with an insulative air space therebetween, the heated nozzle having a bore extending therethrough in alignment with a gate in the cavity plate leading to a cavity, and a nozzle seal seated between the heated nozzle and the cavity plate in alignment with the heater nozzle bore, the seal having a generally cylindrical outer portion extending around the gate, an elongated central pin portion and a plurality of ribs extending therebetween defining a number of apertures whereby the nozzle bore, the outer portion of the seal and the gate form a passage through which pressurized melt flows around the central pin portion into the cavity, the central pin portion having a tip portion extending downstream into the gate and a head portion extending upstream into the heated nozzle bore, the improvement wherein; the elongated central pin portion is integrally formed of a highly conductive inner portion inside an abrasion and corrosion resistant outer portion.

In another of its aspects, the invention provides a method of manufacturing an integral injection molding nozzle seal having a body portion and a central pin portion, the body portion having a generally cylindrical outer portion and a plurality of spaced ribs which extend radially inward from the outer portion to join the pin portion which extends centrally through the outer portion in alignment therewith, the central pin portion having a tip portion extending in one direction and a head portion extending in the opposite direction, the central pin portion being formed of a highly conductive inner portion and an abrasion and corrosion resistant outer portion, comprising the steps of forming the body portion having the outer portion with the plurality of ribs extending radially inward therefrom, the ribs having inward ends which define a central channel therebetween, forming a hollow elongated pin casing out of an abrasion and corrosion resistant material, the pin casing having a closed lower tip and an open upper mouth, inserting a predetermined quantity of highly conductive material into the hollow pin casing through the open mouth, heating the pin casing in an upright position in a vacuum furnace until the highly conductive material melts and runs downward to integrally fill a lower portion of the casing, leaving an empty upper portion of the casing, cutting off an upper portion of the casing to form an integral filled casing portion of a predetermined length, locating the filled casing portion in a predetermined position in the central channel between the ribs, and locating a cap formed of an abrasion and corrosion resistant material on the filled casing portion, and joining the cap to the filled casing portion to form the central pin portion, and the central pin portion to the outer portion to form the integral nozzle seal by applying a brazing material to the joints between them and brazing in a vacuum furnace.

Further objects and advantages of the invention will appear from the following description, taken together with the accompanying drawings.

BRIEF DESCRIPTION OF THE DRAWINGS

FIGS. 3-8 illustrate the sequence of manufacture of the nozzle seal according to a preferred embodiment of the invention.

DESCRIPTION OF THE PREFERRED EMBODIMENTS

Figure 1:
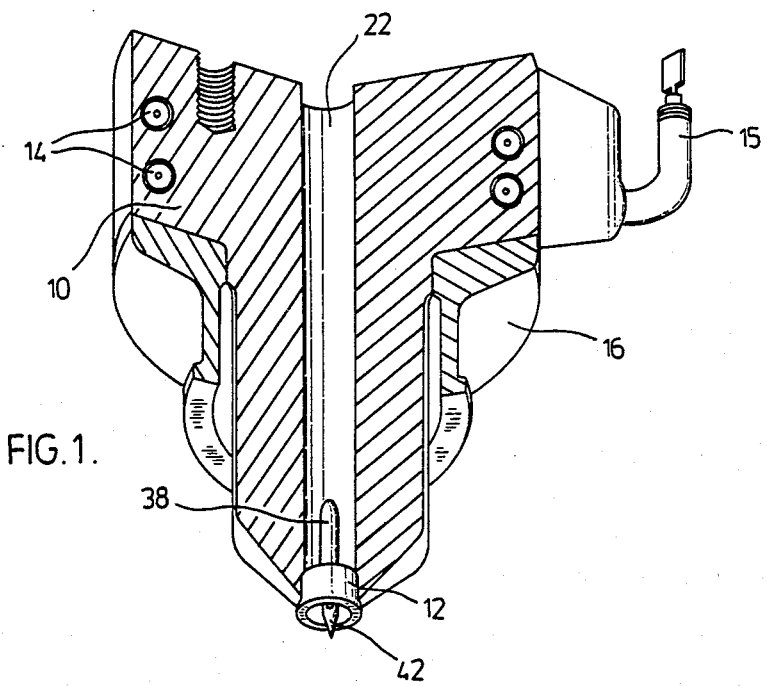
FIG. 1 is a cut-away isometric view showing a heated nozzle with a nozzle seal according to a preferred embodiment of the invention.
Figure 2:
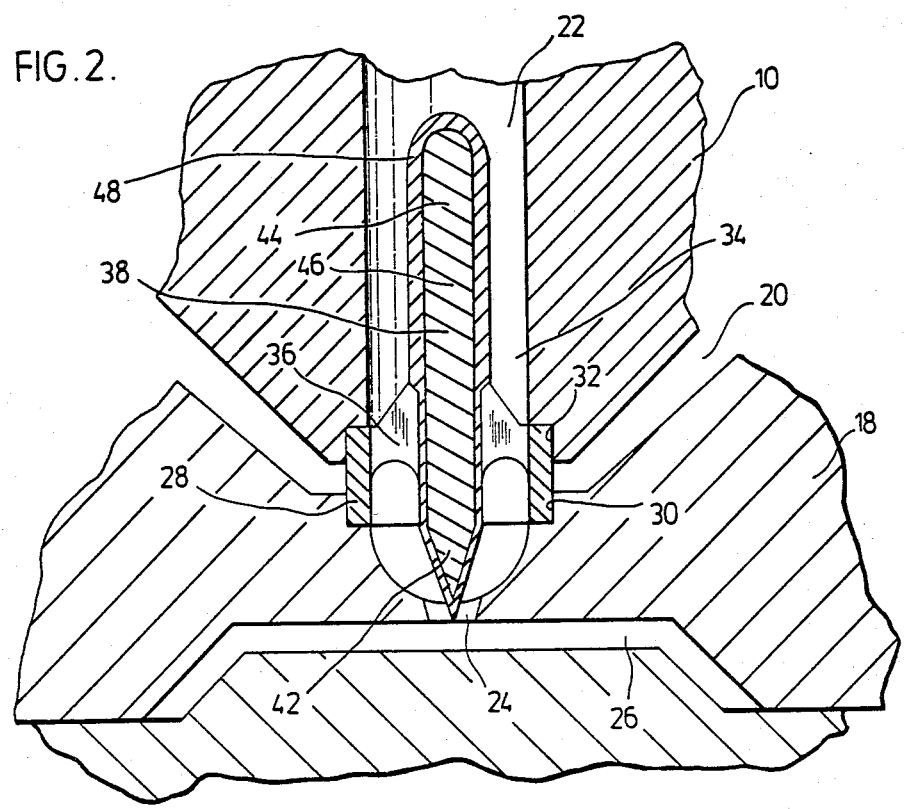
FIG. 2 is a partial sectional view showing the relationship of the nozzle seal seen in FIG. 1 with the cavity plate.

Reference is first made to FIGS. 1 and 2 which show a portion of a heated nozzle 10 with a nozzle seal 12 according to a preferred embodiment of the invention. This type of heated nozzle is cast of a beryllium copper alloy with an electric heater element 14 having cold terminals 15. The heated nozzle 10 is supported by an insulation bushing 16 which is seated in a cavity plate 18 to provide an insulative air space or gap 20 between the heated nozzle and the cavity plate 18 (shown in FIG. 2). The heated nozzle 10 has a central bore 22 in alignment with a gate 24 in the cavity plate leading to the cavity 26.

As may be seen, the nozzle seal 12 has a generally cylindrical outer portion 28 which is seated in a first seat 30 in the cavity plate 18 and a second seat 32 in the heated nozzle 10 to bridge the air gap 20. Thus, the nozzle bore 22, the outer portion 28 of the nozzle seal 12 and the gate 24 in the cavity plate form a melt passage 34 through which pressurized melt flows into the cavity 26 in a controlled cycle. The cycle varies according to the product being molded and the type of material being run, but this is well known in the art and need not be described further. As may clearly be seen in FIG. 8, the nozzle seal 12 has a number of spaced ribs 36 which extend radially inward from the outer portion 28 to a central pin portion 38. This defines a number of apertures 40 between the ribs through which the melt flows. The central pin portion 38 has a tip portion 42 which extends downstream into the gate 24 and a head portion 44 which extends upstream into the nozzle bore 22. The seats 30 and 32 in the cavity plate 18 and the heated nozzle 10 are made to receive the nozzle seal 12 so that the heated nozzle 10 is laterally located relative to the cavity plate 18 and so that the tip portion 42 of the central pin portion 38 is accurately located in the center of the gate 24.

As shown in FIG. 2, the central pin portion 38 of the nozzle seal 12 according to the invention is made with a highly conductive inner portion 46 inside an abrasion and corrosion resistant outer portion or casing 48. In the preferred embodiment, the inner portion 42 is copper and the outer protective casing is high speed steel. The ribs 36 and the outer portion 28 of the nozzle seal are made of stainless steel. The head portion 44 of the central pin portion 38 is enlarged and extends upstream into the melt, while the tip portion 42 is tapered for laminar flow and extends downstream to the edge of the cavity 26.

In use, the system is assembled as described above and power is applied to the heater element 14 to heat up the nozzle 10. The cavity plate 18 is, of course, cooled by cooling means which are not illustrated. Pressurized melt is introduced into the heated nozzle bore 22 from a molding machine (not shown) and a controlled operating cycle is commenced. Melt flows through the melt passage 34 into the cavity 26 when pressure is applied and the pressure is released after the cavity is full. Following cooling, the mold is opened for ejection and then closed and the cycle is repeated. During injection, the melt flows past the head portion 44 of the central pin portion 38, through the apertures 40, along the tip portion 42 and into the cavity 26. Heat absorbed by the head portion 44 from the melt is quickly conducted by the highly conductive copper inner portion 46 to the tip portion 42. This additional heat in the gate area reduces the solidification of the melt when flow stops during cooling and ejection. The copper portion 46 is protected against abrasion and corrosion from the melt by the durable outer portion 48. As will be appreciated, a central pin portion 38 formed of a highly conductive material such as copper would otherwise not be acceptable for use with a material such as glass filled flame retardant nylon due to its susceptibility to corrosion and abrasion.

Figure 3:
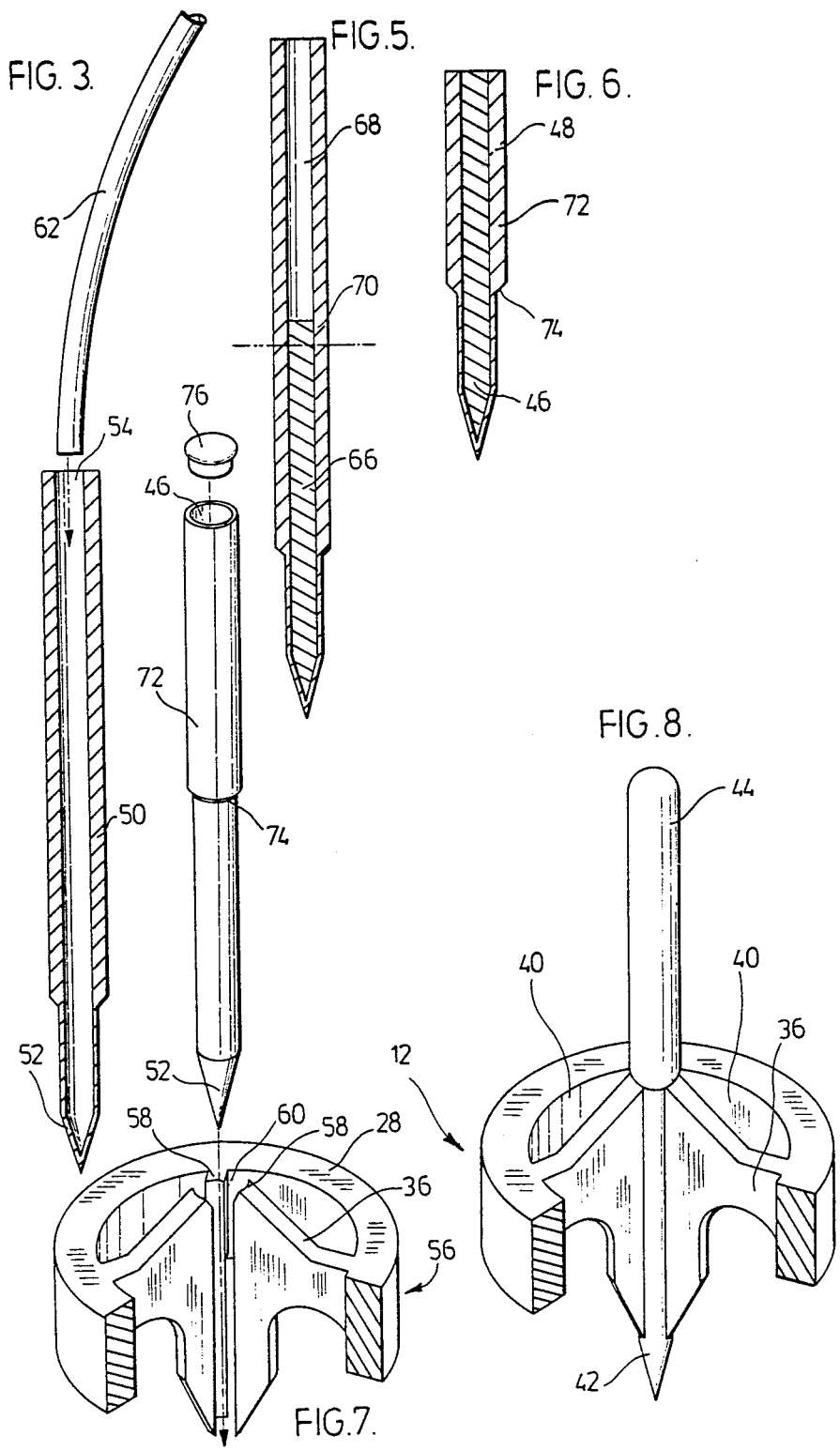
Figure 4:
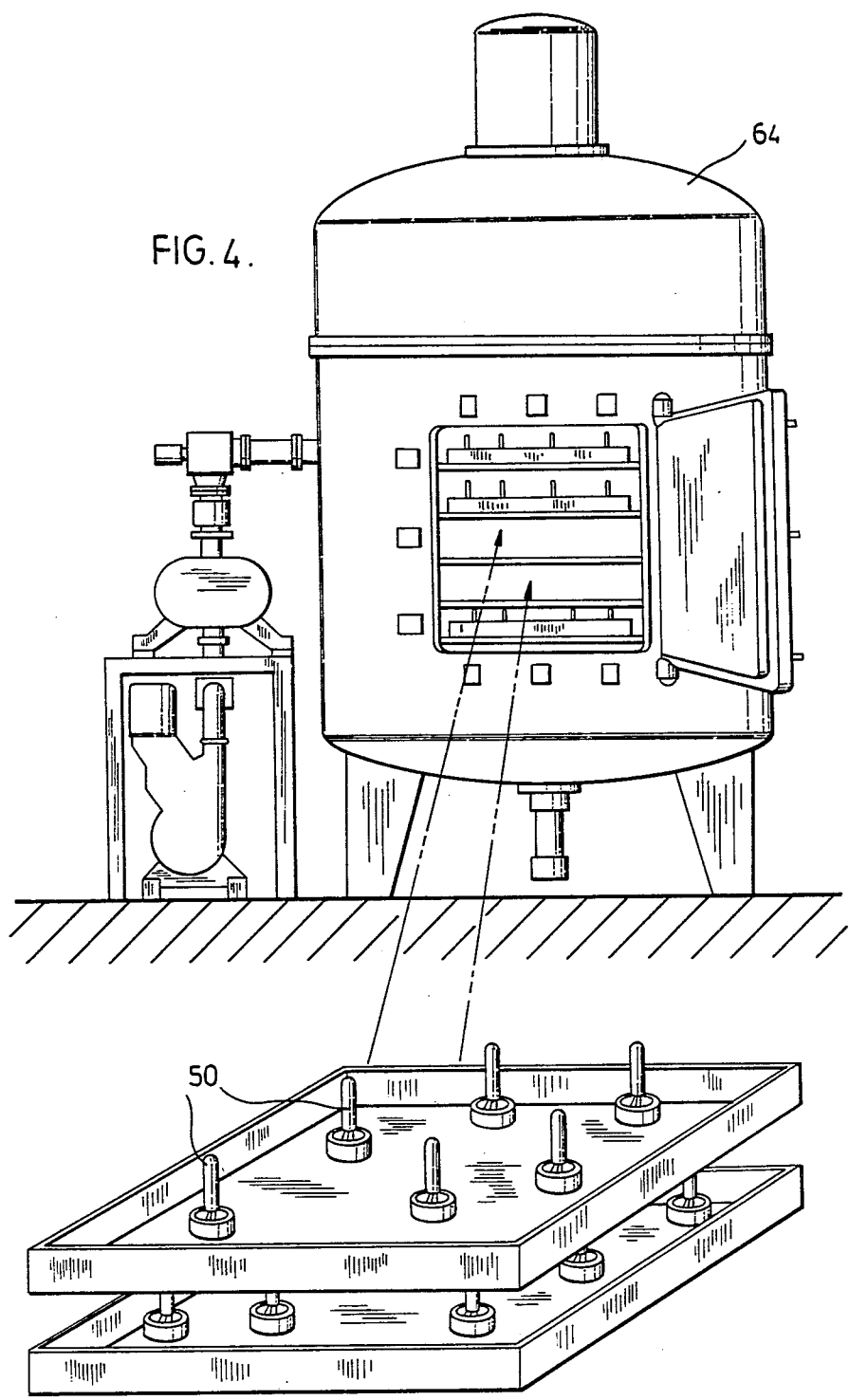

A preferred method of manufacturing the nozzle seal 12 will now be described with reference to FIGS. 3-8. An elongated hollow pin casing 50 is machined and drilled out of high speed steel to have a closed lower tip 52 and an open upper mouth 54. A body portion 56 is machined out of stainless steel with the ribs 36 extending radially inward from the outer portion 28. As may be seen in FIG. 7, the inward ends 58 of the ribs are spaced to define a central channel 60 between them which is shaped to receive the pin casing 50. A quantity of copper 62 calculated to fill the hollow pin casing 50 to a predetermined level is then inserted through its mouth 54 as shown in FIG. 3. The pin casing 50 is then heated in an upright position in a vacuum furnace 64 as shown in FIG. 4 until the copper melts and runs downward in the casing 50 to fill and fuse to a lower portion 66 and leave an empty upper portion 68. As is known, the partial vacuum allows the copper to run very freely and bonds it very closely to the steel casing. When the casing 50 is removed from the vacuum furnace 64, an upper portion 70 is cut off to form an integrally filled casing portion 72 of a predetermined length.

As may be seen in FIG. 6, the filled casing portion 72 has a shoulder 74 at a certain location along its length. The filled casing portion 72 is then inserted into the central channel 60 between the ribs 36 of the body portion 56 in a position wherein the shoulder 74 abuts against the ribs 36. A rounded cap or rivet 76 also formed of high speed steel is fitted onto the filled casing portion 72. A nickel brazing paste is then applied to the joints between the ribs 36 and the filled casing portion 50 and between the cap 76 and the filled casing portion 50. The assembly is then brazed in a vacuum furnace to form an integral nozzle seal 12 as shown in FIG. 8.

While the description of the nozzle seal 12 and the method of making it have been given with respect to preferred embodiments, it is not to be construed in a limiting sense. Variations and modifications will occur to those skilled in the art. For instance, other materials with the appropriate heat conductivity and abrasion and corrosion resistant characteristics may be used to make the nozzle seal. Reference is made to the appended claims for a definition of the invention.

What I claim is:

1. A method of manufacturing an integral injection molding nozzle seal having a body portion and a central pin portion, the body portion having a generally cylindrical outer portion and a plurality of spaced ribs which extend radially inward from the outer portion to join the pin portion which extends centrally through the outer portion in alignment therewith, the central pin portion having a tip portion extending in one direction and a head portion extending in the opposite direction, the central pin portion being formed of a highly conductive inner portion and an abrasion and corrosion resistant outer portion, comprising the steps of:

(a) forming the body portion having the outer portion with the plurality of ribs extending radially inward therefrom, the ribs having inward ends which define a central channel therebetween,
(b) forming a hollow elongated pin casing out of an abrasion and corrosion resistant material, the pin casing having a closed lower tip and an open upper mouth,
(c) inserting a predetermined quantity of highly conductive material into the hollow pin casing through the open mouth,
(d) heating the pin casing in an upright position in a vacuum furnace until the highly conductive material melts and runs downward to integrally fill a lower portion of the casing leaving an empty upper portion of the casing,
(e) cutting off an upper portion of the casing to form an integral filled casing portion of a predetermined length,
(f) locating the filled casing portion in a predetermined position in the central channel between the ribs, and locating a cap formed of an abrasion and corrosion resistant material on the filled casing portion, and
(g) joining the cap to the filled casing portion to form the central pin portion, and the central pin portion to the outer portion to form the integral nozzle seal by applying a brazing material to the joints between them and brazing in a vacuum furnace.

* * * * *